United States Patent

Prager et al.

[11] Patent Number: 5,838,918
[45] Date of Patent: Nov. 17, 1998

[54] DISTRIBUTING SYSTEM CONFIGURATION INFORMATION FROM A MANAGER MACHINE TO SUBSCRIBED ENDPOINT MACHINES IN A DISTRUBUTED COMPUTING ENVIRONMENT

[75] Inventors: Neal R. Prager, Austin; Carey Lee Jung, Cedar Park; Stephen Thomas Cochran, Austin, all of Tex.

[73] Assignee: International Business Machines Corporation, Armonk, N.Y.

[21] Appl. No.: 414,960

[22] Filed: Mar. 31, 1995

Related U.S. Application Data

[63] Continuation of Ser. No. 169,574, Dec. 13, 1993, abandoned.

[51] Int. Cl.⁶ .................................................. G06F 15/177
[52] U.S. Cl. ...................................... 395/200.51; 395/830
[58] Field of Search ................................. 395/600, 200.1, 395/200.5, 200.51, 200.52, 830

[56] References Cited

U.S. PATENT DOCUMENTS

| | | | |
|---|---|---|---|
| 4,815,030 | 3/1989 | Cross et al. | 395/610 |
| 5,109,486 | 4/1992 | Seymour | 395/200.54 |
| 5,165,018 | 11/1992 | Simor | 395/200.52 |
| 5,175,852 | 12/1992 | Johnson et al. | 395/608 |
| 5,202,971 | 4/1993 | Henson et al. | 395/608 |
| 5,220,674 | 6/1993 | Morgan et al. | 395/200.53 |
| 5,230,048 | 7/1993 | Moy | 395/601 |
| 5,301,303 | 4/1994 | Abraham et al. | 395/500 |
| 5,339,435 | 8/1994 | Lubkin et al. | 395/712 |
| 5,394,522 | 2/1995 | Sanchez-Frank et al. | 395/349 |
| 5,442,783 | 8/1995 | Oswald et al. | 395/612 |
| 5,499,357 | 3/1996 | Sonty et al. | 395/500 |

*Primary Examiner*—William M. Treat
*Assistant Examiner*—Kenneth R. Coulter
*Attorney, Agent, or Firm*—Jeffrey S. LaBaw; David H. Judson

[57] ABSTRACT

The invention relates to a method executed by a computer system to increase the ease and efficiency of the configuration management task in large, complex, distributed networks of heterogeneous computer systems. In this paradigm, referred to as management-by-subscription, a central configuration database is used to store configuration information. Individual systems (e.g., computers) express interest in receiving configuration information from the central configuration database through a process known as subscription. By subscribing to the central configuration database a system establishes a persistent relationship (also stored in the central configuration database) through which it becomes eligible for future distributions or updates of the configuration information to which it subscribes. The management-by-subscription paradigm uses object-oriented programming technology to define a class of template objects which can be used by system administrators to establish consistent and coherent configuration management policies (operating guidelines). End-point systems can subscribe to individual template objects, to logical collections of template objects known as a virtual host, or to a combination of templates and virtual hosts. Management-by-subscription, through the use of template objects, allows distributed system's administrators to: (1) divide management tasks between different individuals while maintaining system security, (2) provide a consistent means of propagating and enforcing management policies, and (3) encourage configuration consistency across different platforms.

16 Claims, 6 Drawing Sheets

Microfiche Appendix Included
(4 Microfiche, 259 Pages)

DISTRIBUTING SYSTEM CONFIGURATION INFORMATION FROM A MANAGER MACHINE TO SUBSCRIBED ENDPOINT MACHINES IN A DISTRUBUTED COMPUTING ENVIRONMENT

This application is a continuation of application Ser. No. 08/169,574, filed 13 Dec. 1993, now abandoned entitled DISTRIBUTED NETWORK CONFIGURATION MANAGEMENT USING A SUBSCRIPTION METHOD.

TABLE OF CONTENTS
1. BACKGROUND OF THE INVENTION
    1.1 Environment Overview
    1.2 Configuration Management as Illustration of General Problem Class
    1.3 Some Prior Approaches
2. SUMMARY OF THE INVENTION
3. BRIEF DESCRIPTION OF THE DRAWINGS
4. DETAILED DESCRIPTION OF SPECIFIC EMBODIMENT
    4.1 Overview of Illustrative System
    4.2 Central Configuration Database Templates
    4.3 Template Hierarchy With Virtual Hosts
    4.4 Template Subsystem Components
    4.5 Illustrative Structure of a Template
    4.5(a) State of Template at Subscription Time
    4.5(b) State of Template at Steady-State
    4.5(c) Post-Initialization Database Update Operations
    4.5(d) Pushing versus Pulling of Information
    4.5(e) Support for Heterogeneous Environments
    4.6 Format of Template Database Structures
    4.7 System Management Policy Considerations
    4.7(a) Authorization and Security Delegation Considerations
    4.8 Scalability of the Template Model
    4.8(a) Some Other Advantages of the Template Model
    4.9 Review: Management-by-Subscription
5. CLAIMS
ABSTARCT

1. BACKGROUND OF THE INVENTION

We describe and claim in this specification, an invention relating to a computer system to increase the ease and efficiency of the configuration management task of large, complex, distributed networks of heterogeneous systems.

Microfiche appendix A (2 microfiche sheets with 157 frames) sets out source code for one implementation of the invention. Microfiche appendix B (2 microfiche sheets with 102 frames) sets out copyrighted manuals concerning a commercial software package, created by the assignee of the application, which incorporates aspects of the invention. (Microfiche appendices A and B contain a total 4 microfiche sheets of 259 frames.) Permission is granted to make copies of the appendices solely in connection with the making of facsimile copies of this application or any patent issuing therefrom in accordance with applicable law; all other rights are reserved, and all other reproduction, distribution, creation of derivative works based on the contents, public display, and public performance of the microfiche appendices or any part thereof are prohibited by the copyright laws.
1.1 Environment Overview FIG. 1 depicts a typical (hypothetical) computer network system 100. A variety of components 105 are connected by a variety of communications links 110. The components 105 usually are programmable machines and might be, for example, a mainframe computer, a file server, a workstation, a personal computer, a printer, a complete network, or one or more computer programs (i.e., "software," executing on one or more computers). This latter category of network element may include a variety of software services such as naming services, directory services, and the like. In addition, the components 105 may be from a variety of hardware vendors and may be executing a variety of different operating systems and software. The communications links 110 may be, for example, direct connections, telephone links via modem, or satellite hook-ups. A system 100 such as that shown in FIG. 1 is often referred to as a "distributed system."

Management of a distributed system has many aspects including configuration management (discussed in more detail below), network security management, monitoring of network events and data, analysis of the performance and activity on a network, management of application software, operations management which includes daily activities such as disk file back-up and restore operations, and network management which is the management of the communications themselves—including monitoring of network traffic and hardware failures resulting in lack of connectivity.
1.2 Configuration Management as Illustration of General Problem Class The invention relates to the configuration management of each network element in a distributed system as an illustration of a more general management approach. Here, a "system" may be a host computer, application program, or any other hardware/software logical entity that maintains a configuration database. The management problem includes, for example, determining from time to time and often on a real-time basis:

1. which users have access to each system;
2. what privileges each user has on each system;
3. what file systems are imported or exported from each system;
4. what networks and/or other machines are addressable from each system; and
5. what printers are available to each system.

FIG. 2 shows an expanded view of a distributed system 100. Each component 105 can be seen to maintain its own local configuration database 200 which may contain the kind of information described earlier, e.g., users, printers, available file systems, etc. This information describes the configuration of each component 105.

To continue with the problem statement, the configuration databases 200 tend to be similar for similar types of network components 105 within a particular instance of a distributed system. They are not necessarily identical however, and this is part of the distributed system management problem—maintaining a large amount of similar but not necessarily identical information across a distributed network.

Individual databases 200 are not necessarily identical a) because each component 105 may serve a different purpose in the distributed system and b) by virtue of the fact that the systems 105 can be products from different vendors they may be heterogenous. Thus, the actual "native" format of stored configuration data in one element 105 may be different from that of another element 105, even though they are describing similar entities. Furthermore, the data storage format of each element may be defined by the vendor of that element and, therefore, may be out of the control of the network owner or manager.

Configuration management of a system such as that shown in FIGS. 1 and 2 not only involves maintaining the native configuration databases 200, but also entails determining what action to perform when a change is made to an element 105's configuration. Examples of such actions include: reread a database 200 which has been changed so as to make the changes effective in modifying the element's behavior; to create new files and directories which are independent of the configuration database but which are in the element's file system; or to start or stop system processes.

As a result of these influences, system configuration information can be widely dispersed, poorly correlated, difficult to maintain, and frequently inconsistent. Adding to this situation is the largely dynamic nature of a network which can grow as new hardware and software elements are added. Such additions of a single component 105 may cause the configurations of some or all of the other components 105 in the network 100 to need to be changed to reflect the new element.

It is also difficult for a system administrator of such a network because of the inherent difficulty of obtaining and understanding, in a single logical view, what the network is, i.e., what the configuration of every element in the system is. There seems to be a natural tendency for the configuration of such networks to evolve towards chaos.

This problem is compounded by the fact that there are multiple users, see FIG. 3. Each user 300 that uses the system may have access to change some or all of the network's configuration information. Organizationally, there may be individuals that are responsible for the overall administration of the network, or parts thereof 305. The combined actions of all of these users contribute to the aforementioned chaos in that their actions may conflict and/or result in inconsistent configuration information being stored at different locations in the network.

Another aspect of distributed system configuration management is the notion that system administrators 305 need to be able to enforce a consistent set of rules as to how, for example, new users are created and the various configurations that they are subject to at the time that they are created. Often, one or more central administrators has responsibility for an entire distributed system 100. These central administrators may work with other administrators who may have responsibility for a subset of the system 100, and users who may desire to make small changes to their own systems 105.

Implementing this kind of control over procedures and rules is usually done through word of mouth, paper and other types of written documentation, and an understanding (by both the system administrators and individual users) of what they are supposed to do—often, however, there is no enforcement. This ad hoc approach can make it difficult to implement, and enforce, a consistent and coherent configuration management policy.

1.3 Some Prior Approaches

A number of prior approaches have attempted to address the problems discussed above. Our present understanding of pertinent features of some of those prior approaches is summarized in Table 1.

A public domain software package, rdist, is distributed as part of the University of California at Berkeley's UNIX operating system. Rdist implements a simple file distribution mechanism: files located at a central repository are copied to remote sites of the distributed system, elements 105 in FIGS. 1, 2, and 3. Rdist can do some comparisons of dates and times on the files to determine what files need to be updated from the central repository on the remote systems.

Another prior approach is seen in the Moira system, which was developed at the Massachusetts Institute of Technology as part of Project Athena to manage their distributed network. Moira can distribute files and, in addition, perform some actions at the remote site after delivering the files. This is done by distributing scripts or programs along with the files. These scripts/programs can then be executed as a post-processing processing action. Moira also contains a feature which allows the configuration information, which eventually become files at the remote sites, to be maintained in a central configuration database which is built upon a relational database.

Another widely used prior art technique is the network information services (NIS) product from Sun Microsystems. NIS takes a different approach towards configuration management in that it has a central configuration database which is accessed by the client (remote) systems or components 105 in the distributed system 100. In NIS, configuration information, or at least some portion of it, is no longer to stored locally at each remote site; rather, the remote machines rely upon a central database to receive their configurations. NIS does allow some limited capability for local overrides at the remote sites to the information that is in the central database. It does not have any form of post-processing at the client sites as does Moira. NIS requires modification to the operating system of each element 105 in the distributed network and, in fact, in order to be effective, must be part of the component vendor's operating system distribution. For example, Sun Microsystems delivers NIS as part of their operating system product, as do some of the other major UNIX vendors.

TABLE 1

Selected Features of Prior Approaches rdist public domain software (UC Berkeley)
simple file distribution
can do some date/time comparisons to determine what files need
to be updated Moira developed at MIT as part of Project Athena
distributes files and performs actions at a remote site
somewhat object-oriented
configuration information maintained in a central configuration
database Network Information Services (NIS)

commercial product from Sun Microsystems (SunSoft)
central configuration database which is accessed by client systems
limited local overrides to information in central configuration
database
no post-processing at the client (remote) site NIS+ is a next-generation product from Sun Microsystems. It is similar to NIS but is enhanced in many ways. It has a hierarchical set of configuration databases but still shares the feature that client sites access a central database server machine to receive their configuration information.

2. SUMMARY OF THE INVENTION

The invention relates to a method executed by a computer system to increase the ease and efficiency of the configuration management task in large, complex, distributed networks of heterogeneous computer systems. In a paradigm referred to as management-by-subscription, a central configuration database, maintained by a manager machine, is used to store system configuration information.

Individual systems (e.g., computers and other programmable machines) express interest in receiving configuration information from the central configuration database through a process known as subscription. By subscribing to the central configuration database, a system establishes a persistent relationship (also stored in the central configuration database) through which it becomes eligible for future distributions or updates of the configuration information to which it subscribes.

The illustrative example, described herein, of the management-by-subscription paradigm uses object-oriented programming technology to define a class of template objects. Template objects provide the interface through which system administrators maintain configuration databases and establish a consistent and coherent set of configuration management policies or operating guidelines. It will be appreciated by those of ordinary skill having the benefit of this disclosure that the invention can be implemented without the benefit of object-oriented techniques without departing from the inventive concept described herein.

End-point systems (i.e., individual computer systems or other programmable machines within the distributed system itself) can subscribe to individual template objects, to logical collections of template objects—known as a virtual host, or to a combination of templates and virtual hosts. Virtual hosts give an administrator a means of collecting different configuration data and associated operating policies (expressed as templates) into a single logical entity. By subscribing to a virtual host a system is, in reality, subscribing to a predetermined set of policies and configuration data.

Management-by-subscription, through the use of template objects, allows distributed system's administrators: (1) to divide management tasks between different individuals while maintaining system security; (2) to provide a consistent means of propagating configuration data and enforcing management policies; and (3) encourage configuration consistency across different platforms.

3. BRIEF DESCRIPTION OF THE DRAWINGS

4. DETAILED DESCRIPTION OF SPECIFIC EMBODIMENT

One illustrative embodiment of the invention is described below as it might be implemented on a general purpose computer using a suitable high-level language such as C, C++, or Objective-C. In the interest of clarity, not all features of an actual implementation are described in this specification. It will of course be appreciated that in the development of any such actual implementation (as in any software development project), numerous implementation-specific decisions must be made to achieve the developers' specific goals and subgoals, such as compliance with system- and business-related constraints, which will vary from one implementation to another. Moreover, it will be appreciated that such a development effort might be complex and time-consuming, but would nevertheless be a routine undertaking of software engineering for those of ordinary skill having the benefit of this disclosure.

For purposes of further illustration, microfiche appendix A includes source code for one implementation of the invention. Microfiche appendix B includes copyrighted manuals containing general use information concerning a commercial software package distributed by the assignee of the application program which incorporates the invention.

4.1 Overview of Illustrative System

Figure 4:
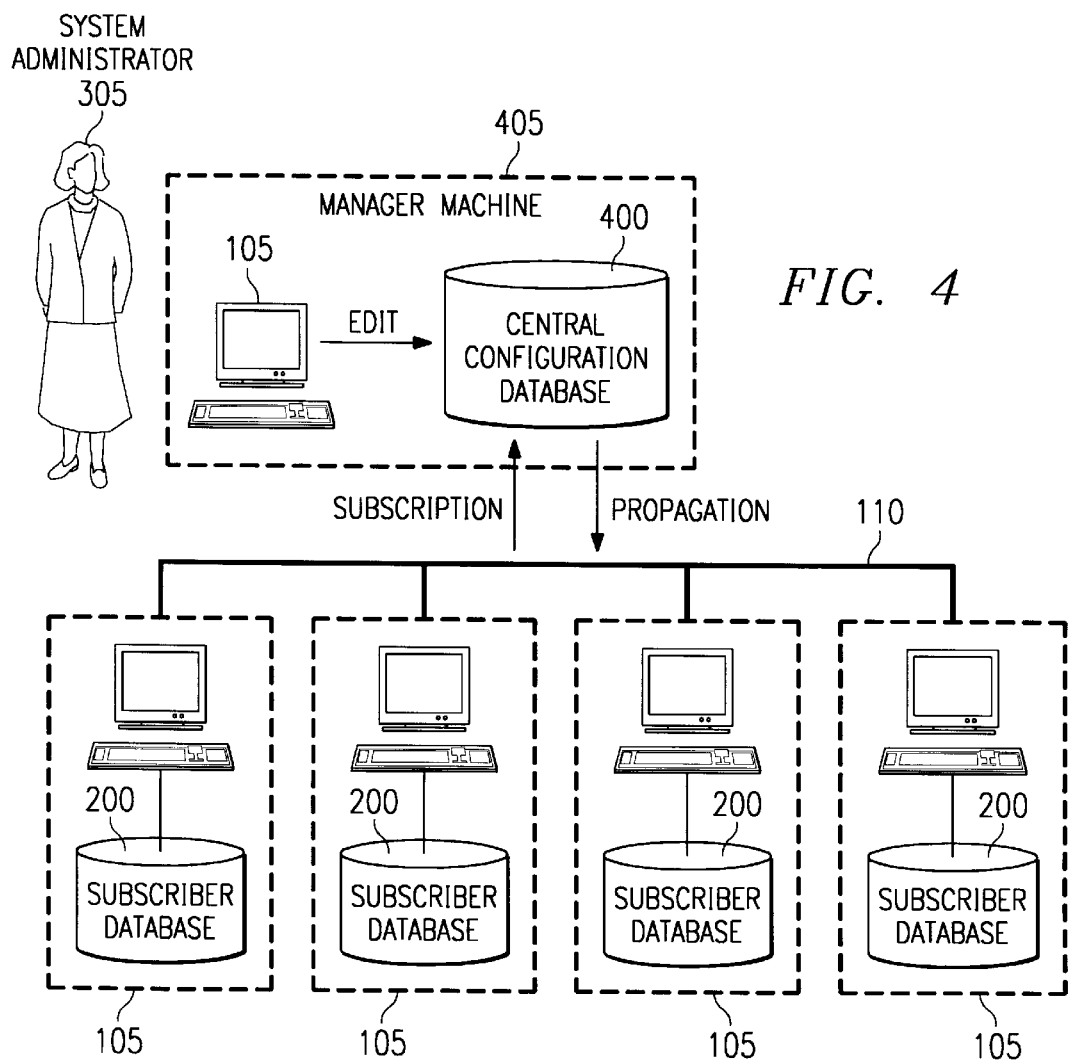
FIG. 4 is a block diagram representing the (high-level) logical structure of a management-by-subscription approach in accordance with the invention.

FIG. 4 illustrates our general approach to the distributed system's management problem, which we call management-by-subscription. In this paradigm, there is a central configuration database 400 is maintained as part of a manager machine 405 and contains configuration information of various types which may be used by the various components 105 of the distributed system. Such configuration information may include information usable to configure a component 105 to a specified operational use, e.g., as a "spreadsheet" machine.

Figure 5:
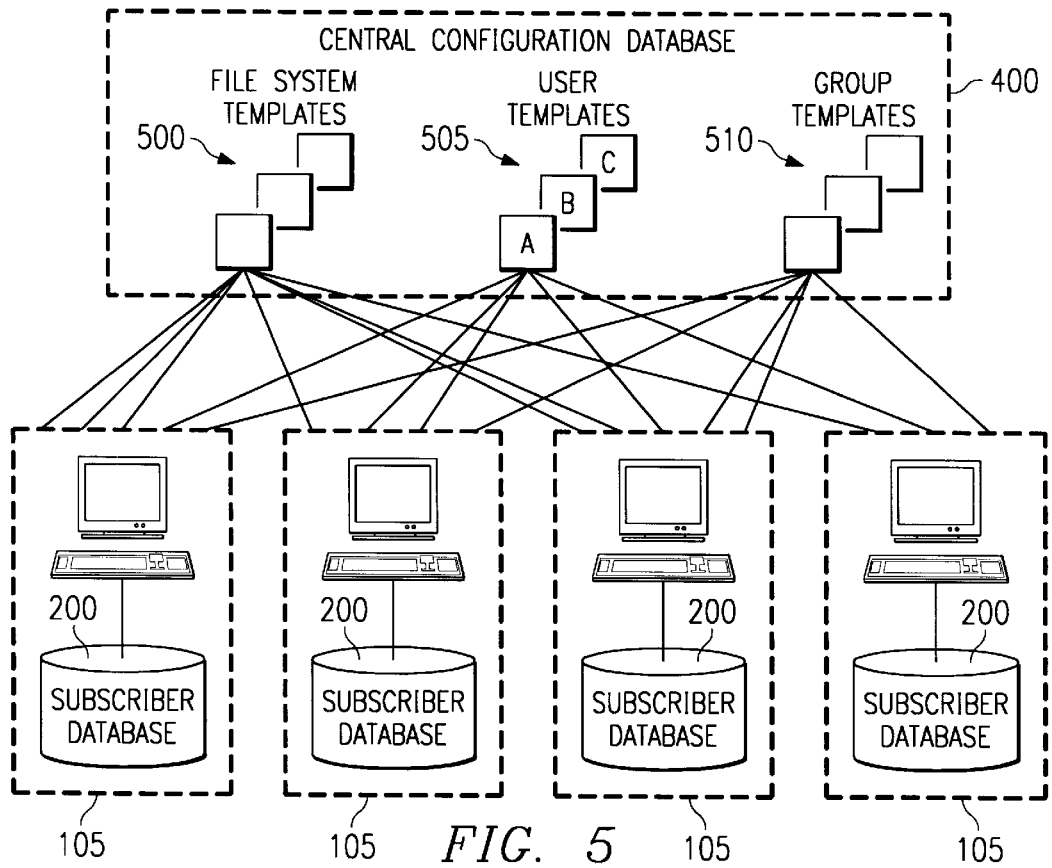
FIG. 5 is a block diagram representing an implementation of configuration templates.

Distributed components 105 express interest in receiving configuration information from the central configuration database 400 through a process we call "subscription." By subscribing to the central configuration database or, as we shall see in FIG. 5, to a particular portion of the central configuration database, the component 105 establishes a persistent relationship which is also stored in the database 400 through which it becomes eligible for future distributions or propagation of the configuration information to which it subscribes.

A system administrator 305 is able to edit the central configuration database and that is, in fact, part of the invention: an interface for making edits to that database. As can be seen in FIG. 4, however, each vendor component 105 continues to maintain its own local subscriber database 200. When information from the central configuration database 400 is propagated out to a remote site 105, it is in fact copied into the correct location at the remote site via one or more electronic template signals.

4.2 Central Configuration Database Templates

An example view of the central configuration database 400 is shown in FIG. 5. The central configuration database is now seen to be organized into a set of templates, for example 500, 505, and 510. A template is defined as a data structure organized to model an abstraction of some portion of a system or network configuration. Each template logically maintains a database of configuration information.

Information is stored in a template in a platform-independent way. This means the information is not stored in a format specific to any of the specific vendors of the components 105 who may be subscribers (e.g., in the native formats of the components 105), but rather is kept in an abstracted form, sometimes referred to as a "configuration format." For example, in the case of the user template 505, the user information is typically stored on a UNIX system in a file called /etc/passwd. On most UNIX systems there are variations to what files are used and what information is in each file, i.e., from one vendor's operating system to the next. The user template 505, however, simply stores the pertinent information that describes a user account in a manner which is independent of what destination file and format that information may eventually be stored in once it reaches the component 105 at propagation time.

Subscribers, which are the components 105, may pick and choose the configurations to which they subscribe out of a set of templates available in the central configuration database 400. Typically, what is found is not only multiple types of templates such as shown here (file system templates 500, user templates 510, and group templates 510) but also a number of different instances of each type of template. There may be several instances of user templates 505, each of which may describe one set of users versus another set of users. For example, a particular system may have accounts for users from templates 505 A, B, and C, while another system may only allow accounts from users of templates A and B.

Up to this point, we have discussed subscribers as if they were hardware entities. This is the common, but not the only, case. Subscribers can be of two types:

1. Template End-Point: A resource in a distributed system that maintains some sort of actual system configuration and thus can be a destination for a template configuration. For example, a host is a template end-point which, in the case of UNIX, typically will store configuration information in one or more files in the /etc directory. An NIS domain may also be a template end-point, in which case when configuration information is propagated to that type of end-point, it is stored in an NIS database. The same is true for NIS+.

2. Virtual Host: A mechanism to logically group collections of templates.

The Virtual Host concept is discussed in more detail below.

4.3 Template Hierarchy With Virtual Hosts

Figure 6:
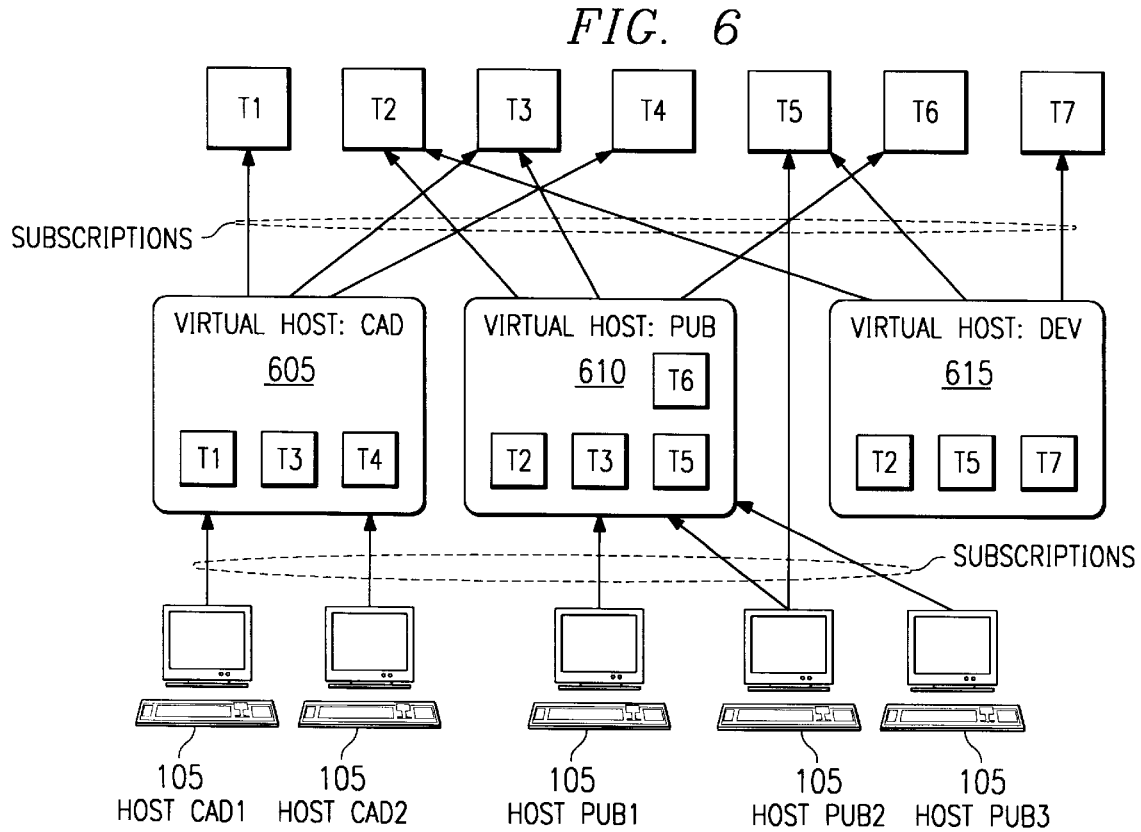
FIG. 6 is a block diagram representing a possible relationship between templates and user end-points through the invention's virtual host construct.

FIG. 6 shows a subscription hierarchy including a series of templates T1 through T7, virtual hosts 605, 610, 615, and template end-points 105. Each template, T1 through T7, represents a single template similar to the file system templates 500, user templates 505, and group templates 510 shown in FIG. 5.

A virtual host is defined as a collection mechanism for templates. It has the feature of multiplexing template-to-template end-point subscription relationships. The potential number of template end-points (e.g., a personal computer or workstation) can be tremendous in a large distributed network. There may be a large number of templates to describe all the different possible configuration information. The number of arrows—representing subscription relationships in FIG. 6—that would need to be drawn if there were no virtual hosts could be large. As a result, the complexity of maintaining the subscription relationship would be very large.

One purpose of the virtual host is that it can be used to define an effectively complete host configuration; thus the term "virtual host." A virtual host subscribes to at least one template and, by virtue of this, forms a grouping of templates. This grouping can be a description of a complete host configuration, for example. By then subscribing individual hosts (end-points 105) to a virtual host, the individual hosts are caused to subscribe to all of the templates which are subscribed to by the virtual host and, as a consequence, the individual hosts become eligible for distributions of those templates.

A common characteristic of distributed systems is that when there are large numbers of template end-points, e.g., hosts, they tend to be grouped into categories that are often related to specified operation configurations for the hosts. For example, as shown in FIG. 6, there may be a group of computer systems for computer-aided design (CAD) which are labelled Host CAD 1 and Host CAD 2. There may be another group of computer systems which are used for desk-top publishing which are labelled Host Pub1, Host Pub2, and Host Pub3. These two different groups of end-points may have nearly identical configurations. By using the virtual host construct, a system administrator can define a virtual host which describes the typical CAD configuration 605 or the typical desk-top publishing configuration 610. Subscribing the individual hosts or end-points (Host CAD 1, Host CAD 2, Host Pub1, Host Pub2, and Host Pub3) to the appropriate virtual host makes it simpler to maintain, and manage, a consistent configuration.

Another purpose of the virtual host is to ease the installation of new hosts (end-points) into the network by simply subscribing them to a predefined virtual host. By propagating the templates from that virtual host to the new host, the new host is immediately configured as it should be. This is as opposed to having to remember that for this type of host, one needs to subscribe to n number of templates. The system administrator simply subscribes a new "physical" host to a single virtual host.

The subscription relationships described in FIG. 6 are such that virtual hosts may subscribe to any number of templates. A template end-point may subscribe to either a single virtual host, to a number of virtual hosts, or to some combination of virtual hosts and templates. Thus, individual end-points can still subscribe directly to templates. The virtual host is an optional component in this hierarchy.

4.4 Template Subsystem Components

Figure 7:
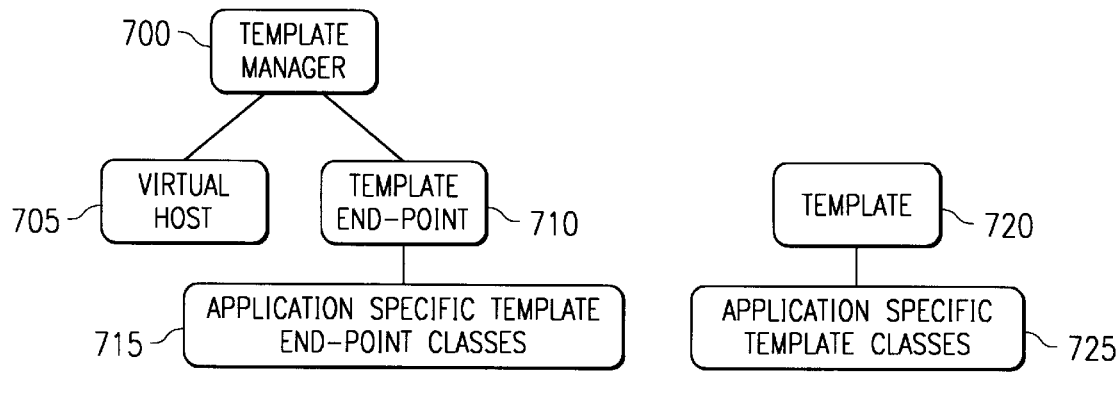
FIG. 7 shows the class hierarchy of a template object.

A hierarchical representation of the object-oriented template system's software components is shown in FIG. 7. Because the illustrative embodiment utilizes object-oriented technology, each element in FIG. 7 represents an object or class of objects. The lines connecting different objects in FIG. 7 represent inheritance relationships. Objects on top represent the superclass and objects below them represent subclasses.

The template manager 700 provides the basic functionality which is used to support the template paradigm. This includes the management of template databases and supports a number of interfaces for reading and writing the database, adding new records, and modifying existing records. Template managers also provide a mechanism for setting up subscription relationships and for performing the propagation of the template database.

The virtual host 705 is a subclass of the template manager. (In that sense, it is a template manager.) In addition to having the same functionality as the template manager, the virtual host acts as a collection of templates as shown in FIG. 6 (605, 610, and 615). As a collection of templates, the virtual host 705 supports some additional functionality such as multi-template operations. For example, from a virtual host 705, a system administrator can propagate a number of templates as a single operation, or, one can subscribe to a number of templates in a single operation.

Template end-point 710 is another subclass to the template manager. It too supports the same behavior as the template manager. Its purpose, however, is to support additional behavior focused around the registration of an application and platform-specific component with the template end-point. The application-specific component will be described in more detail later. It is the template end-point 710 that is responsible for the actual reading and writing of the end-point configuration files or system databases. The template end-point objects that exist in a distributed system are derived from the template class and are shown collectively as element 715. Examples of template end-point classes are host, NIS, and NIS+ domains.

The (base class) object template 720 is used for developing application-specific template objects. A template object is always associated with a template manager object. A template object supports some application-specific interface for performing edits, subscription, and propagation of the template database. For example, a user template may have an operation called "add-user" so that the clients of the templates (e.g., those end-points subscribed to the user template) can think in terms of the type of resource which is being managed. The template would then rely on the template manager which has a lower level interface such as "add-a-record to the database." So, "add-user" gets translated by the template object into an "add-record" operation at the lower level interface. The template object hides the details of the database implementation from the clients of the template object.

4.5 Illustrative Structure of a Template

Figure 8:
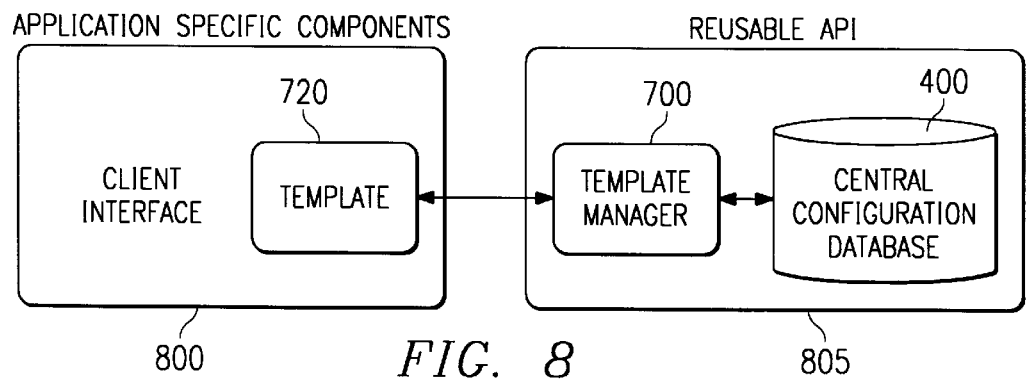
FIGS. 8 through 10 show progressively more detailed block diagrams of the use of template objects to create an organized configuration management system.

The relationship between a template object 720 and its template manager object 700 is shown in detail in FIG. 8. The template manager object 700 manages the central template database 400 directly. The template object 720 supports application-specific functionality depending on the type of template it is (e.g., user, file system, group).

Box 805 represents the reusable object framework of the illustrative embodiment's application program interface (API)—the illustrative embodiment serves as a platform for developing distributed system management applications. Box 800 represents the application-specific portion of a system management application and is developed independently for each type of template in each application. The template object 720 presents the interface to the outside world of this component. The client interface can be either a graphical user interface (GUI) or a command-line interface (CLI) to the template object.

4.5(a) State of Template at Subscription Time

Figure 9:
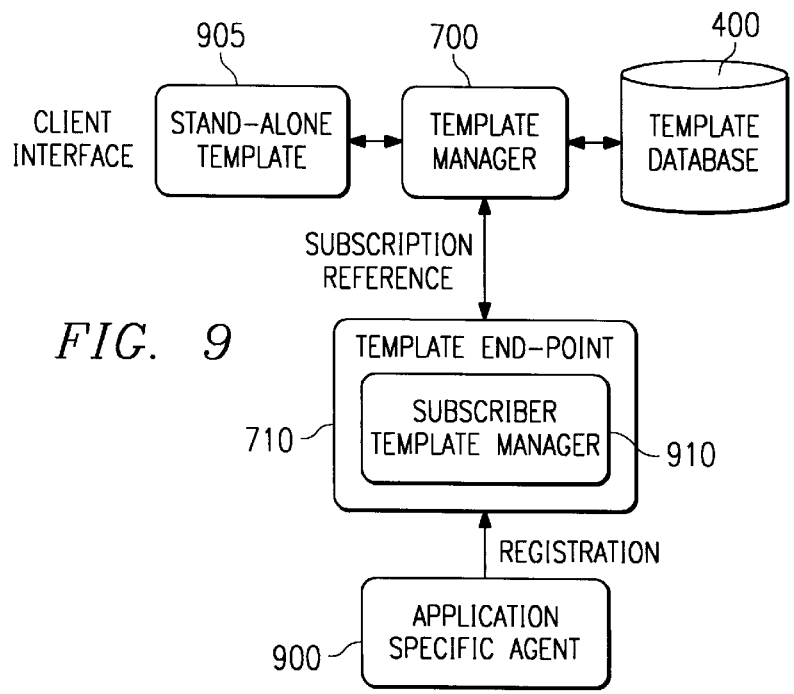

FIG. 9 shows how the various components of the template system (see FIG. 7) are related at the time just after a template end-point is subscribed to by a template. For simplicity, template end-point 710 has only a single template. FIG. 9 could also include a virtual host as an intermediate point in the system hierarchy, i.e., between the template end-point 710 and the template manager 700. The connection between the template end-point 710 and the template manager 700 represents a subscription reference. Since the template end-point class is a subclass of the template manager class, the template end-point 710 can be thought of as containing a template manager, shown in this case as the subscriber's template manager 910. Another feature of a template end-point is its ability to register an application-specific agent 900. What effect this has on the operation of the system will be discussed below.

4.5(b) State of Template at Steady-State

Figure 10:
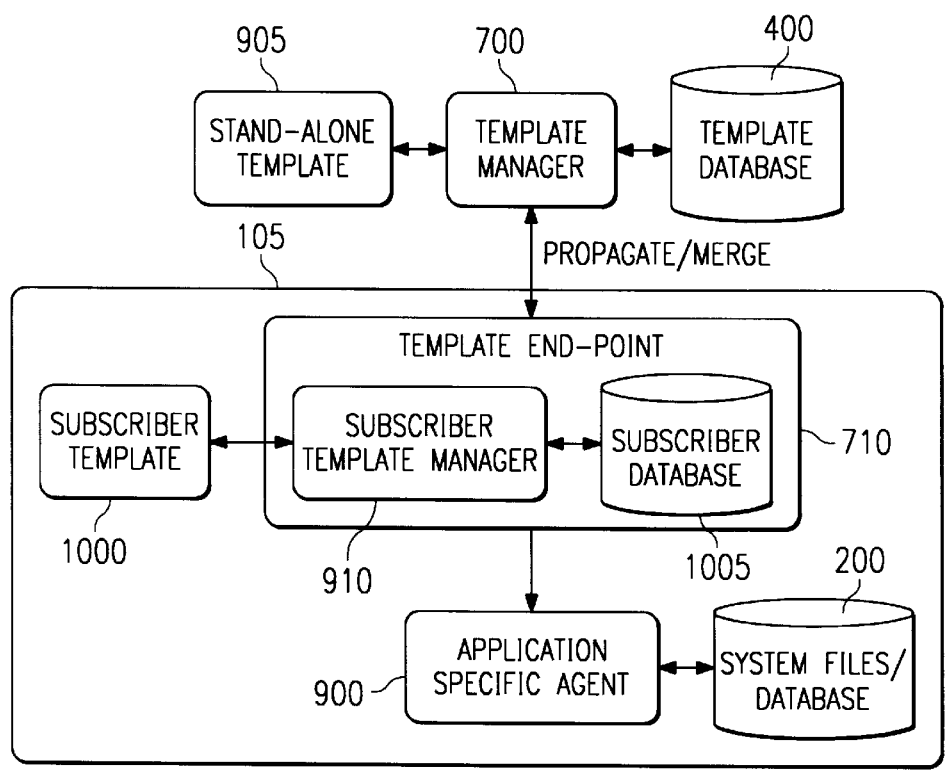

FIG. 10 shows the system of FIG. 9 after the initial propagation of information about the stand-alone template 905, from the central configuration database 400, to the end-point template 710. Part of what happens at propagation time is that a copy of the relevant portions of the central configuration database 400 (i.e., those portions that pertain to a template end-point of the type being initialized) is made at the end-point 105. This operation creates a subscriber copy 1000 of the stand-alone template 905 and a local copy—referred to as the subscriber's database 1005—of the relevant portions of the central configuration database 400.

At initialization, subscriber template 1000 is essentially identical to the stand-alone template 905, except for the fact that it is associated with the template end-point's subscriber template manager 910 instead of with the template manager 700. Template 1000 can support the same client interface as can the stand-alone template 905 and has the same ability to support a graphical interface. The difference is that any edits that are made through that interface of template 1000 are reflected in the local sub scriber database 1005. Edits that are made using template 905's interface, on the other hand, result in changes to the central configuration database 400. Thus, after initialization of the subscriber's template database 1005, future modifications which may be made to the stand-alone template 905 go into the central configuration database 400.

The preceding point is an important aspect of the invention: the subscriber template 1000 is edited in the subscriber's context. This capability can be used, at the remote (end-point 105) site, to override data that was originally defined during initialization, to add to the original template definition, or to remove portions of the original template definition. This allows the subscriber to make changes from the generic configuration.

By virtue of the fact that the application specific agent 900 is registered with the template end-point 710, the template end-point will, at propagation time, pass its configuration management information on to the application-specific agent so that it may process it and actually write the physical system files and/or databases which control the behavior of the end-point system. The system files and databases modified as a result of this operation are in the local end-point's database 200.

Another important aspect is that the original stand-alone template 905 controls what information, out of its central configuration database 400, is overrideable at the subscriber's location. The stand-alone template 905 is able to fix or lock any record or attribute (a field within a record) in the central configuration database 400. This has the effect of making that particular piece of information read-only when it is copied into the subscriber's version 1005 of the database.

Registration, as differentiated from subscription, is something that happens only locally within a template end-point. The application-specific agent 900 registers with an end-point so that at propagation time it will be the recipient of that end-point's information and therefore process it and write out system files or databases. The application-specific agent is not only application-specific but also platform-specific. Template end-points, on the other hand, are generic. For example, IBM AIX or SunOS workstations would both have an identical template end-point 710 component but would each have an independent and different (application-specific) registered agent. Each agent would perform actions and process data in a manner specific to the type of template end-point with which it is registered.

4.5(c) Post-Initialization Database Update Operations

After initialization, any future propagation of information from the stand-alone template 905 to the subscriber template 1000 causes a database merge operation to be invoked. The system administrator who does the propagation can specify that the stand-alone template's value be forced. This has the effect that all local modifications which were made at the subscriber's database 1005 are overwritten with the information from the central configuration database 400. This provides the system administrator a way of overriding changes which may be undesirable or because of errors which may have been made at the subscriber location. The system administrator can also choose not-forced as the update or propagation option. This has the effect that any modifications previously made at the subscriber's location 1005 are retained while at the same time any new or changed information of the stand-alone template 905 is merged with the subscriber database 1005.

The merge algorithm may consider several factors including, e.g., whether a record or attribute was fixed in the stand-alone template's configuration database 400, whether a record or attribute was locally defined at the subscriber's location (subscriber database 1005), or whether a particular record was deleted in the stand-alone template's configuration database 400 or in the subscriber's database 1005.

After the propagation and merge operation, the subscriber template manager 910 still has a single instance of the subscriber database 1005. It is this fully-merged data that is passed on to the application-specific agent 900. In fact, the application writer, or person who composes a particular application, does not have to be familiar with the details of how the database merge is performed—the template end-point 710 outputs the fully merged information as input to the application-specific agent 900.

4.5(d) Pushing versus Pulling of Information

Up until now, we have described propagation as an operation initiated from the stand-alone template 905. This is referred to as a push of the template. It is also possible to pull the information from the central configuration database 400 to the subscriber's database 1005. In the latter case, the information transfer operation is initiated from the subscriber template 1000.

There is an important difference between the push and pull operations, although the end effect is the same. The difference comes in as more of a question of authorization. A system administrator who is authorized to push, or propagate, information from the stand-alone template 905 is essentially capable of causing changes to all of the subscribing entities to that template and therefore needs a higher level of authority. In contrast, an order to perform a pull of information is guaranteed to only update the particular template end-point 710 from which the pull was initiated. It will not have any impact on other subscribers to the stand-alone template 905. Thus, a lower level of authority is possible.

4.5(e) Support for Heterogeneous Environments

An important feature of the architecture shown in FIG. 10 is that it supports heterogeneous environments. Heterogeneous, in this case, is defined as multiple hardware architectures and operating systems for the various end-point systems 105 in the distributed system 100. Information from the stand-alone template 905 and the central configuration database 400 can be stored in a platform-independent format. This data remains in its platform-independent format when it is propagated to the template end-point 710 and stored in the subscriber's database 1005. It also remains in its platform-independent format when it is provided as input to the application-specific and platform-specific agent 900. Only at this final step in the propagation-subscription scheme is the data converted into a platform-dependant (i.e., native) format whereby it can be written to the end-point's actual system files.

This is what is called a "receiver-makes-right" architecture, in that the end receiver (the application-specific agent 900) takes the data and does whatever is necessary to meet the requirements of its native hardware and operating platform.

4.6 Format of Template Database Structures

The databases which are part of the template components 400 and 1005 in FIG. 10 are organized in such a way as to support the functionality just described, that is, to merge databases, to override central database configuration data at local subscriber sites, and the like. Each database (400 or 1005) is organized as a set of records, where each record has a single key and a list of attributes. Table 2 summarizes the data maintained in the databases.

For example, if the application in question was a manager of user accounts, a database might be organized where there is a single record for each user account. The key to that record may be the user's name. The list of attributes would be the attributes of that user's account such as password, home directory, mail aliases, etc.

Figure 11:
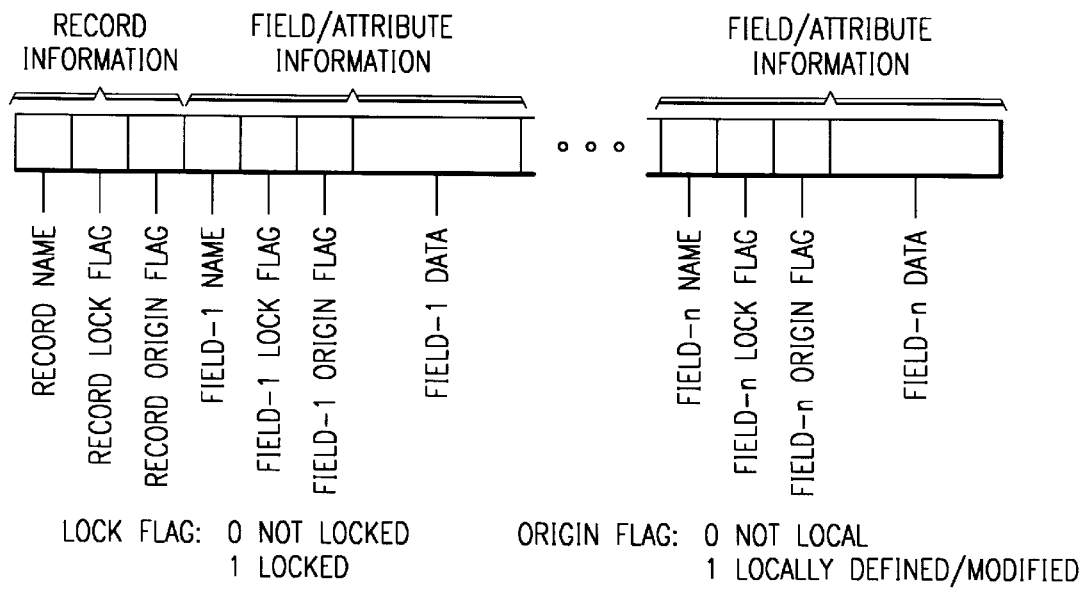
FIG. 11 shows the structure of a single record of a template object's configuration database.

In addition to this basic configuration information the database also maintains, for each record, whether that record was created in the local context or whether it was received from a source (stand-alone) template. FIG. 11 outlines the logical structure of a single database record.

TABLE 2

Template Database

Data is organized as a set of records each record has a single key
each record maintains a list of attributes
Additional information maintained about each record whether it was created locally or received from a stand-alone, or source, template
whether it is fixed (locked) or not
Additional information maintained about each attribute whether it was created/edited locally
whether it is fixed (locked) or not Each record in logically divided into 2 parts: a record information part and a field or attribute information part. The record information part can include the following:

1. a record name value, e.g., the user name associated with a user account, identifying the specific record;
2. a record lock flag indicator—indicating the record should not be modified at the end-point; and
3. a record origin flag indicator—indicating whether the record was created at the central configuration database or at the end-point.

Similarly, the field or attribute information section can contain a field name, a field lock flag indictor, a field origin flag indicator, and a field data value. There is one group of field information fields for each attribute in the record.

4.7 System Management Policy Considerations

Template databases (e.g., 400 and 1005) can also store information which is used to implement system management policies. Policy, as used here, is defined as a set of rules or procedures which system administrators use to guide their management of a distributed network and, in particular, when changing system configurations (see Section 1.2). The use of templates provides a formal means/capability to store and propagate policy rules within template databases. This, in turn, allows system managers to maintain a consistent and coherent configuration management policy.

Policy rules are of two types. First, there are default policies which are used when new resources are created from within a template context. For example, when a new user is created the user template 505 can provide a set of values which specify default values for certain attributes of the user account. In this way all newly created user accounts exhibit the same general structure. A second type of policy is a validation policy. A validation policy is a set of rules which constrain what values can be assigned to the various attributes of the records contained in a database. Again using the new user example, a validation policy can put constraints on what the legal values are for the various attributes such as home directory, password, etc.

Because policies are stored as part of the template database 400, they are propagated along with the rest of the template information to subscribers when the template is subscribed—implementing a consistent new-user policy for example. Also as a result of this, the policies themselves can be overridden by particular subscribers if that is desired. For example, there may be a set of user accounts defined in the user template 505 which do not have passwords. This might occur in an open environment where passwords are not required. For example, a specific subscriber host which has modem access to the outside world may, because of security considerations, require that all users have passwords. Thus, the password policy can be overridden on that subscribing host such that all users, when they are defined in the local database of the "modem" host, will be required to have a password. As with all other information in the template database, the policy rules can be fixed in the templates such that they cannot be overridden by subscribers.

4.7(a) Authorization and Security Delegation Considerations

Figure 1:
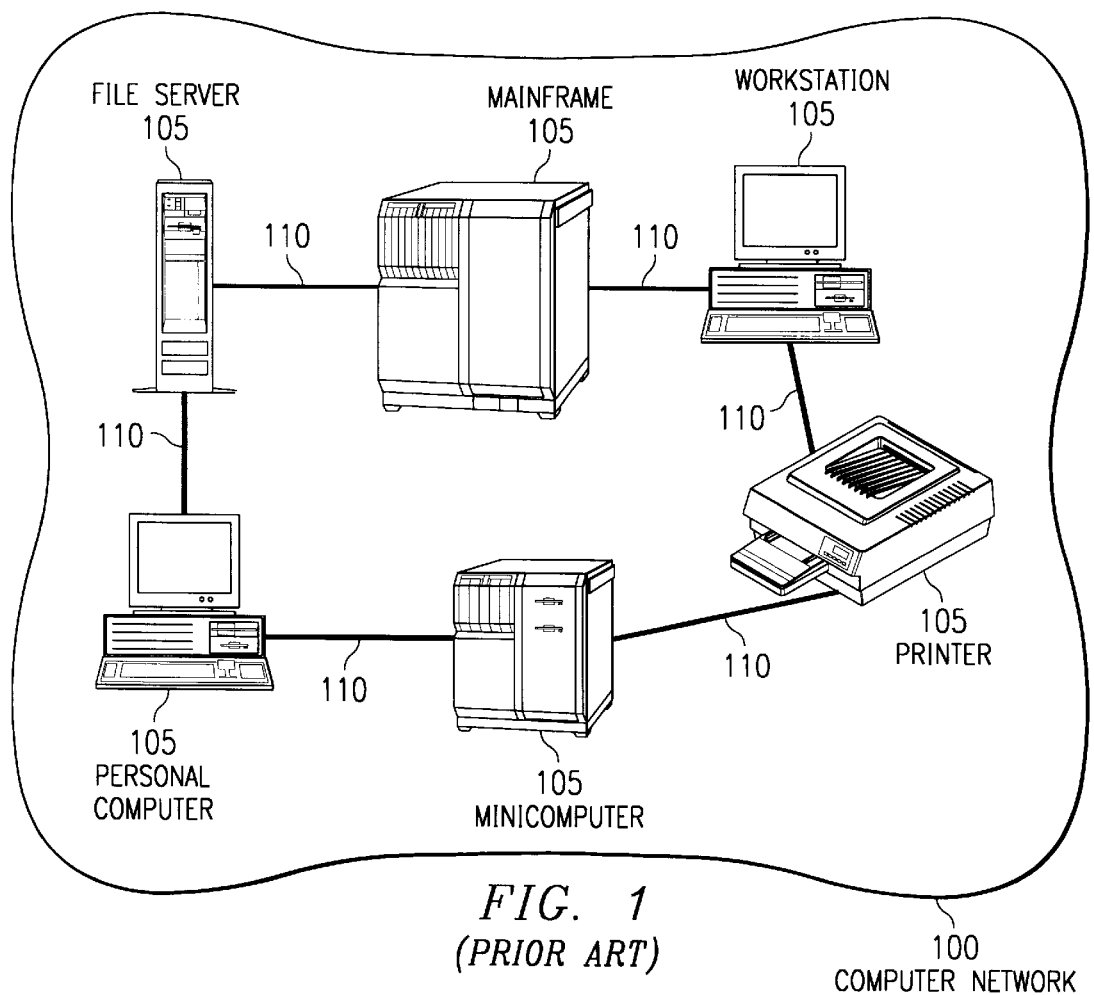
FIGS. 1 through 3 are block diagrams of typical (e.g., prior art) heterogeneous and distributed computer networks.
Figure 2:
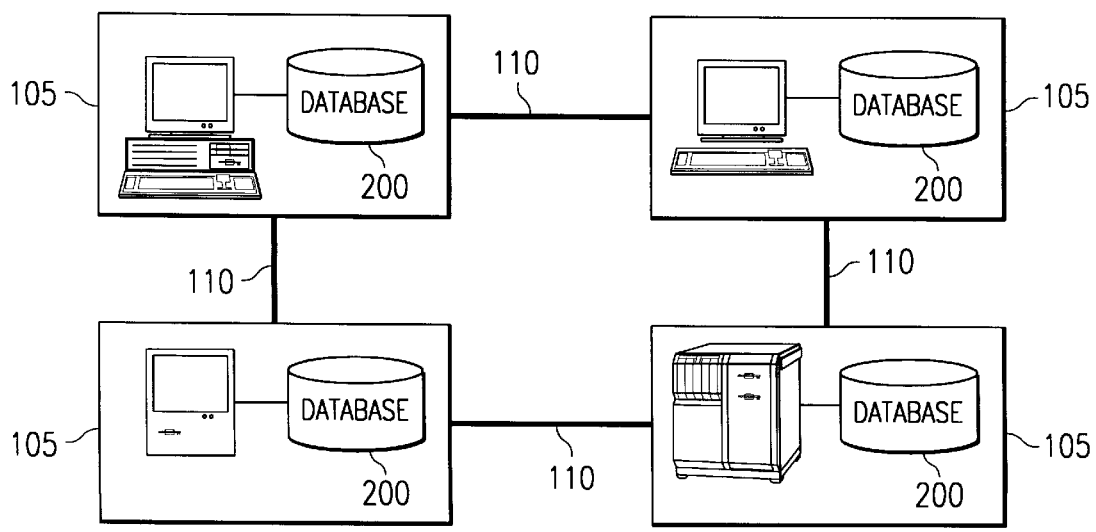
Figure 3:
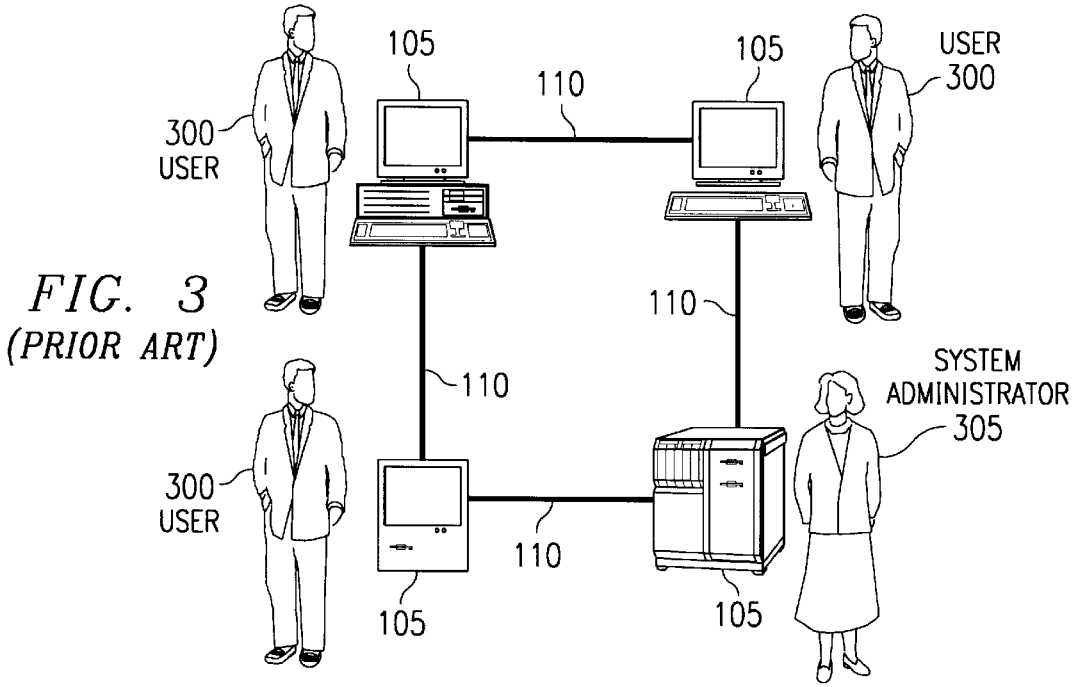

The template model or paradigm also supports the differentiation of responsibilities among central and local or work group system administrators. In FIG. 3 we saw a typical organizational framework in the way distributed system's administrators are assigned: a central administrator has responsibility for all management functions. With a template model, senior or central administrators can be assigned responsibility for managing and controlling central configuration databases. Work group administrators can be assigned responsibility and authority to manage some subset of subscribing systems or, for example, a complete virtual host and all of the virtual host's subscribers.

Using the concept of policies in conjunction with templates, central system administrators can control or constrain particular records/attributes in a template database. This, in turn, constrains what work group administrators are able to do at the subscribing locations.

4.8 Scalability of the Template Model

In evaluating the scalability of the template model, there are two key issues. The first is, can this model support the management of large networks (as in many hosts, printers, etc)? Second, can the template model support management of a large number of resources (as in many users)? A large number of systems refers to a large number of end-points 105s—subscribers. A large number of resources refers to the size of the data that may be stored in the template databases 400 and 1005. There are several ways in which the illustrative embodiment does, in fact, meet these scalability requirements.

Figure 12:
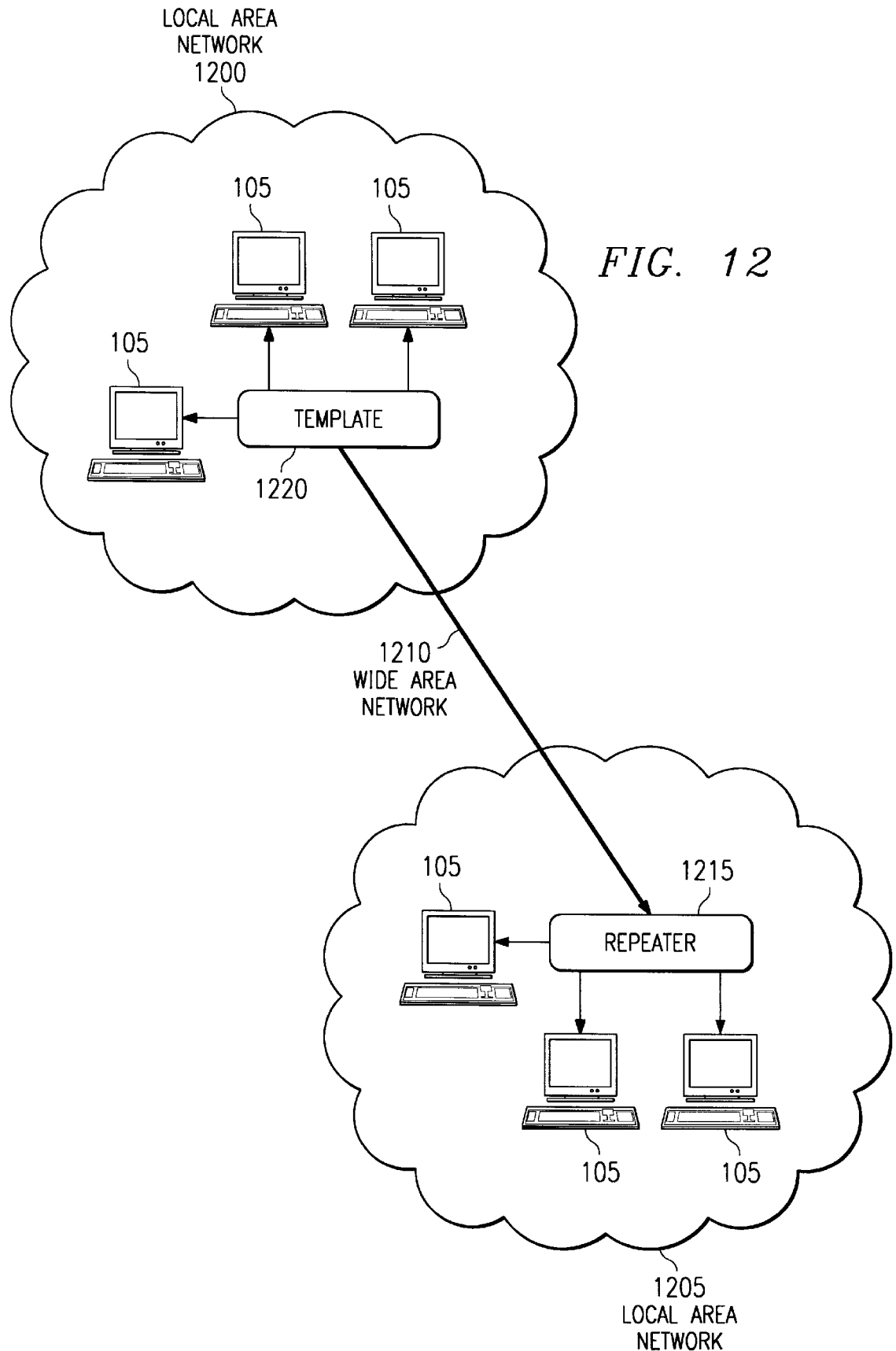
FIG. 12 is a block diagram representing how a system in accordance with the invention efficiently distributes configuration information between two interconnected local area networks.

FIG. 12 shows an illustrative large network where there are two independent local area networks 1200 and 1205 are interconnected via a wide area network 1210. This example could be expanded to encompass many local area networks, each of which might have dozens or even hundreds of systems connected by many wide area network connections. (It will be appreciated by those of ordinary skill having benefit of this disclosure, however, that the wide area network 1210 is merely illustrative of any system in which a plurality of subsystems, each of which subsystem may itself be complex, are connected together.)

For example, the workstations 105 shown in local area network 1205 can be subscribers to a template 1220 that is defined in local area network 1200. Thus, when template 1220 is updated its information is transmitted to those end-points in both local area networks 1200 and 1205 that subscribe to it. One feature of template propagation is that the distribution of template data is done in parallel. Because the data is sent simultaneously to a number of different subscribers, and each subscriber processes the data independently and in parallel, this method is more efficient and faster than traditional (serial) methods.

Even though all of the workstations 105 shown in local area network 1205 subscribe to template 1220, the template only sends a single copy of its configuration data over the link 1210. A repeater object 1215 receives the single copy and redistributes the information to the actual template subscribers 105. This allows the minimum amount of information to be physically transmitted over a link such as 1210.

The repeater object 1215 is another object which is developed as part of the template system, although it is not specific to templates per se. It has no knowledge or intelligence about the data which is sent to it. Rather, it simply knows how to take its input data and pass that data on to some set of destinations. Thus, when template 1220 performs a propagation under the scenario shown in FIG. 12, it will send the configuration information to each of the local work stations shown as 105 in the local area network 1200 and one copy of the information, along with a list of destination addresses, to the workstations 105 in local area network 1205 via the repeater object 1215.

Also built into the template manager object is the ability to only distribute the information which has changed or modified since the last propagation. This too reduces network traffic to the various subscribers. This feature addresses the aforementioned second component of scalability—the ability to handle a large number of resources, i.e., large amounts of data.

4.8(a) Some Other Advantages of the Template Model

Some other advantages of the template model described herein are summarized in Table 3. An issue not discussed previously, but which is cited in Table 3, is the autonomous nature of individual hosts in the illustrative implementation. This is in stark contrast to prior art solutions such as NIS. In the present invention, configuration information is maintained locally. As a result, systems do not depend upon the availability of a central server for their day-to-day operations. In the case of NIS, if a server goes down due to a hardware or software malfunction, the client systems of that server do not know their own configuration and therefore are largely disabled. Such a problem is less likely using the management-by-subscription paradigm.

The invention supports heterogeneity by not requiring every end-point to support the central configuration database's data format. That is, each end-point is capable of maintaining a different version (by virtue of information content or information format) of the information contained in the central configuration database.

TABLE 3

Some Advantages of the Template Model

Encourages (but does not require) consistency across system.
Heterogeneity encourages abstraction of common features
Application architecture is simplified application programmers do not need to worry about the
distributed environment, it is accounted for by the functionality of
the template objects
Each host is autonomous configuration information is maintained locally, so systems don't
depend on the availability of a central server for day-to-day
operations
Simplicity configuration information is maintained locally, so there is no
need for caching schemes
system administrator's control when changes are propagated to
individual hosts 4.9 Review: Management-by-Subscription Management-by-subscription is a paradigm that utilizes a central configuration database executing on a manager machine to store configuration information. End-points (e.g., individual computers or other programmable machines) in a distributed network express interest in receiving configuration information from the central configuration database through a process called "subscription." By subscribing to the central configuration database, an end-point establishes a persistent relationship (also stored in the central configuration database) through which it becomes eligible for future distributions of the configuration information to which it subscribes.

The central configuration database is logically organized into a set of templates. A template is defined as a data structure organized to model an abstraction of some portion of a system or network configuration. Information within a template is stored in a (configuration) format that is independent of the of any of the internal storage (native) formats of the individual end-points in the distributed network.

Individual end-points may pick and choose the configurations (e.g., templates) to which they subscribe. While the most common type of end-point subscriber is a hardware unit, such as a host computer, an end-point may also be a software application executing on a programmable machine.

Another aspect of the management-by-subscription paradigm is the virtual host. A virtual host is a collection mechanism for templates, and has the feature of multiplexing template-to-template end-point subscription relationships. One purpose of a virtual host is to define an effectively complete host configuration. When an end-point subscribes to a virtual host it, in effect, subscribes to all of the virtual host's templates and, as a consequence, becomes eligible for distributions of those templates.

After an end-point has subscribed to one or more templates, the opportunity exists for the (end-point's) subscriber's database to become modified with respect to the central configuration database—from which it was initialized. Periodically, and often in real-time, the subscriber's database can be reconciled with the central configuration database though propagate and merge operations. The system administrator who does the propagation can specify that the central configuration database's values be forced or unforced. In the forced mode, values within the subscriber's database are overwritten with information from the central configuration database. In the unforced mode any modifications previously made to the subscriber's database are retained. After either forced or unforced propagate and merge operations, the end-point is left with a single copy of its subscriber database.

It will be appreciated by those of ordinary skill having the benefit of this disclosure that numerous variations from the foregoing illustration will be possible without departing from the inventive concept described herein. Accordingly, it is the claims set forth below, and not merely the foregoing illustration, which are intended to define the exclusive rights claimed in this application program.

What is claimed is:

1. A method of distributing system configuration information from a manager machine to a set of one or more endpoint machines in a distributed computing environment to configure said set of endpoint machines, the manager machine supporting a template manager and a central configuration database in which system configuration information is stored in a generic configuration format and organized into a set of templates, and wherein at least one or more endpoint machines are configurable using system configuration information in a respective native configuration format that differs from the generic configuration format, said method comprising the steps of:

(a) in response to a subscription request from an endpoint machine identifying a template, copying the template manager to the endpoint machine to generate a subscriber template manager;

(b) propagating a portion of the central configuration database associated with the template from the manager machine to the endpoint machine to generate a subscriber database in which system configuration information is stored in the generic configuration format, wherein said system configuration information defines one or more of (1) user access rights and user privileges, said user access rights and user privileges including file read, file write and application execution; (2) file system access rights, and file system access rights including access to one or more specified file systems in a distributed computer system; (3) network connections, said network connections including a description of physical and logical connections between said one or more endpoint machines; and (4) printer availability; and (c) propagating the system configuration information in the generic configuration format from the subscriber database to an application running on the endpoint machine.

2. The method as described in claim 1 further including the step of using the subscriber template manager to modify the system configuration information stored in the subscriber database prior to step (c).

3. The method as described in claim 2 further including the step of:

(d) translating the system configuration information in the generic configuration format to the native configuration format to configure system resources associated with the application.

4. The method as described in claim 3 wherein the translation is performed by the application.

5. The method as described in claim 2 further including the step of propagating new system configuration information in the generic configuration format from the manager machine to the endpoint machine.

6. The method as described in claim 5 wherein the new system configuration information overrides modifications to the system configuration information stored in the subscriber database.

7. The method as described in claim 5 wherein the new system configuration information does not override modifications to the system configuration information stored in the subscriber database.

8. A method of distributing system configuration information from a manager machine to a set of one or more endpoint machines in a distributed computing environment to configure said set of endpoint machines, the manager machine supporting a template manager and a central configuration database in which system configuration information is stored in a generic configuration format, and wherein at least one or more endpoint machines are configurable using system configuration information in a respective native configuration format that differs from the generic configuration format, said method comprising the steps of:

(a) in response to each subscription request from an endpoint machine, copying the template manager to the endpoint machine to generate a subscriber template manager;

(b) following subscription in step (a), propagating at least a portion of the central configuration database from the manager machine to the endpoint machine to generate a subscriber database in which system configuration information is stored in the generic configuration format, wherein the system configuration information includes at least one or more of the following types: (1) user access rights and user privileges; (2) file system access rights; (3) network connections; and (4) printer availability;

(c) using the subscriber template manager to modify at least a portion of the system configuration information stored in the subscriber database;

(d) propagating the system configuration information as modified in step (c) from the subscriber database to an application specific agent running on the endpoint machine; and (e) translating the system configuration information in the generic configuration format to the native configuration format to configure system resources associated with the application specific agent.

9. The method as described in claim 8 further including the step of propagating new system configuration information in the generic configuration format from the manager machine to the endpoint machine.

10. The method as described in claim 9 wherein the new system configuration information overrides modifications to the system configuration information stored in the subscriber database.

11. The method as described in claim 9 wherein the new system configuration information does not override modifications to the system configuration information stored in the subscriber database.

12. A computer connected to receive configuration information from a manager machine in a distributed computing environment, the manager machine supporting a template manager and a central configuration database in which system configuration information is stored in a generic configuration format and organized into a set of templates, and wherein the computer is configurable using system configuration information in a native configuration format that differs from the generic configuration format, the computer comprising:

means for subscribing to the manager machine to receive system configuration information, wherein the system configuration information defines one or more of (1) user access rights and user privileges, said user access rights and user privileges including file read, file write and application execution; (2) file system access rights, and file system access rights including access to one or more specified file systems in a distributed computer system; (3) network connections, said network connections including a description of physical and logical connections between said one or more endpoint machines; and (4) printer availability;

means responsive to the subscribing means for receiving and storing a copy of the template manager;

means responsive to the subscribing means for receiving and storing a copy of a portion of the central configuration database associated with one of the templates and in which system configuration information is stored in the generic configuration format; and means for propagating the system configuration information in the generic configuration format to an application running on the computer.

13. The computer as described in claim 12 further including:

means for translating the system configuration information in the generic configuration format to the native configuration format to configure system resources associated with the application.

14. The computer as described in claim 12 further including:

means for modifying the system configuration information.

15. A computer program product readable by a computer and encoding computer system executable instructions to control the computer to receive configuration information from a manager machine in a distributed computing environment, the manager machine supporting a template manager and a central configuration database in which system configuration information is stored in a generic configuration format and organized into a set of templates, and wherein the computer is configurable using system configuration information in a native configuration format that differs from the generic configuration format, the executable instructions comprising:

means for subscribing to the manager machine to receive system configuration information, wherein the system configuration information includes at least one or more of the following types: (1) user access rights and user privileges; (2) file system access rights; (3) network connections; and (4) printer availability;

means responsive to the subscribing means for receiving and storing a copy of the template manager;

means responsive to the subscribing means for receiving and storing a copy of a portion of the central configuration database associated with one of the set of templates and in which system configuration information is stored in the generic configuration format; and means for propagating the system configuration information in the generic configuration format to an application running on the computer.

16. The computer program product as described in claim 15 wherein the executable instructions further include:

means for translating the system configuration information in the generic configuration format to the native configuration format to configure system resources associated with the application.

* * * * *